(12) United States Patent  
Gray

(10) Patent No.: US 8,197,341 B2  
(45) Date of Patent: Jun. 12, 2012

(54) SUPPORT FOR A VIDEO GAME CONTROLLER

(76) Inventor: Jeremy Nicholas Gray, East Leake (GB)

(*) Notice: Subject to any disclaimer, the term of this patent is extended or adjusted under 35 U.S.C. 154(b) by 90 days.

(21) Appl. No.: 12/443,283

(22) PCT Filed: Sep. 28, 2007

(86) PCT No.: PCT/GB2007/003715  
§ 371 (c)(1),  
(2), (4) Date: Jan. 13, 2010

(87) PCT Pub. No.: WO2008/038027  
PCT Pub. Date: Apr. 3, 2008

(65) Prior Publication Data  
US 2010/0144437 A1 Jun. 10, 2010

(30) Foreign Application Priority Data  
Sep. 28, 2006 (GB) .................................. 0619134.0

(51) Int. Cl.  
*G06F 17/00* (2006.01)
(52) U.S. Cl. ........................................ 463/36
(58) Field of Classification Search ............. 463/36–38, 463/46, 47; 273/441, 442, 444  
See application file for complete search history.

(56) References Cited

U.S. PATENT DOCUMENTS

| | | | |
|---|---|---|---|
| 5,951,018 A * | 9/1999 | Mamitsu ...................... 273/442 |
| 6,568,334 B1 * | 5/2003 | Gaudette et al. ................ 108/43 |
| 6,776,104 B2 * | 8/2004 | Herbst ............................ 108/25 |
| 7,156,026 B2 * | 1/2007 | McClellion ..................... 108/43 |
| D544,923 S * | 6/2007 | Brase et al. ................... D21/326 |
| 7,828,157 B2 * | 11/2010 | Thorsen ....................... 211/26.2 |
| 7,857,311 B2 * | 12/2010 | Minke ....................... 273/148 R |
| 2002/0185041 A1 | 12/2002 | Herbst |
| 2005/0159219 A1 | 7/2005 | Oswald |
| 2005/0255925 A1 | 11/2005 | Brase et al. |
| 2011/0296945 A1 * | 12/2011 | Jaouen et al. ................... 74/512 |

* cited by examiner

*Primary Examiner* — Ronald Laneau  
(74) *Attorney, Agent, or Firm* — Stites & Harbison PLLC; Marvin Petry

(57) ABSTRACT

A support means for a controller for controlling a game which simulates a human activity involving hand and foot movements, for example the driving of a vehicle, the controller comprising a hand-operated device and a foot-operated device operable by a player of the game to cause the game to simulate such movements. The support means comprises a base (1) adapted to be supported on the floor or ground and having a platform (2) for mounting the hand-operated device (C1) of the controller which is pivotally mounted on a first member (15) which is mounted for rectilinear sliding movement on a second member (18) pivotally mounted on the base to facilitate angular, height and rectilinear adjustment of the device, and a platform (3) for mounting the foot-operated device which is mounted on a member (5) which is mounted for rectilinear sliding movement on the base to facilitate angular and rectilinear adjustment of the device.

14 Claims, 5 Drawing Sheets

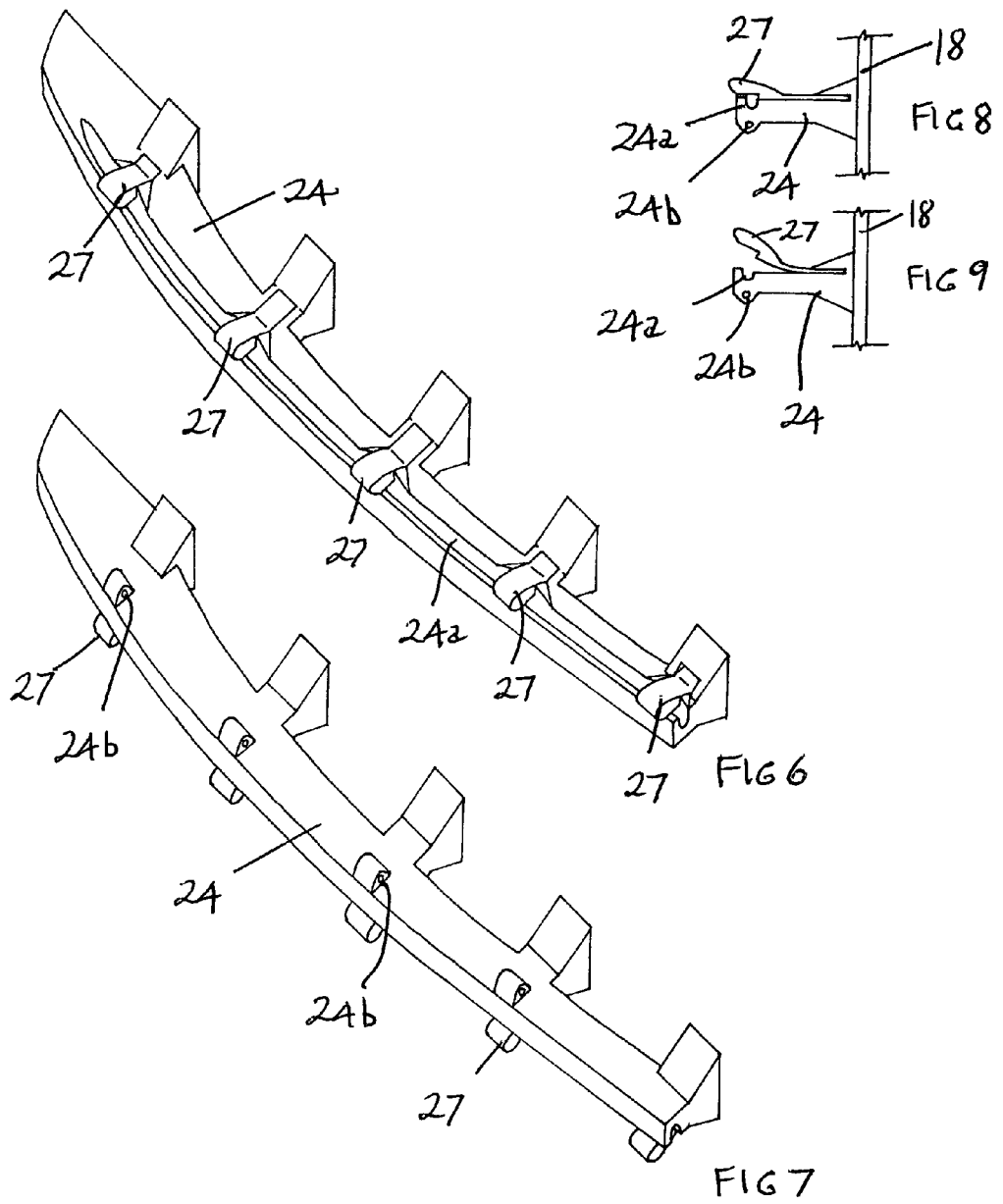

SUPPORT FOR A VIDEO GAME CONTROLLER

Figure 1:
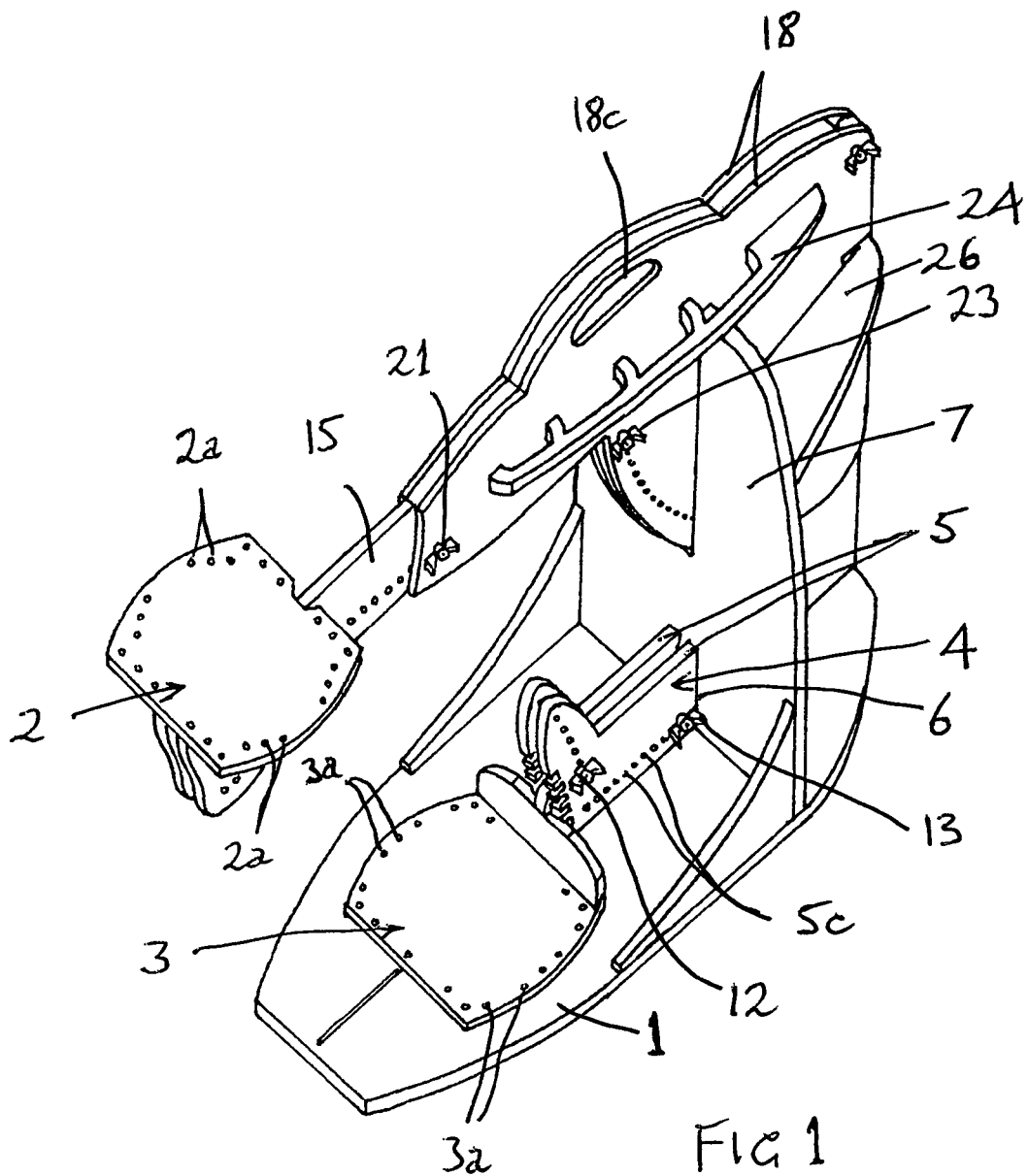

This invention relates to controllers for controlling video and computer games.

In particular, the invention is concerned with controllers of the kind (hereinafter referred to as the kind specified) for controlling a game which simulates a human activity involving hand and foot movements, the controller comprising a hand-operated device and a foot-operated device operable by a player of the game to cause the game to simulate such movements.

The invention has been devised primarily in connection with controllers for controlling a game which simulates the driving of a vehicle such as a road car or a racing car, the hand-operated device of the controller being in the form of a steering wheel unit which is movable to control the direction of travel of the vehicle, and the foot-operated device being in the form of a pedal unit having one or more pedals which are movable to control acceleration or/and braking of the vehicle. Such a controller is hereinafter referred to as a driving controller.

It is to be understood, however, that the invention is not limited to driving controllers as the invention may also be applied to, for example, a controller for controlling a game which simulates the flying of an aeroplane, in which case the hand-operated unit is in the form of a joystick movable to control the aeroplane and the foot-operated unit is in the form of accelerator and braking pedals.

In a controller of the kind specified the hand- and foot-operated units are separate and, in use, a player usually adopts a sitting position and places the hand-operated unit in his or her lap or on his or her knees or on a desk or table top, with the foot-operated unit placed on the floor. Using the units in this way has a number of disadvantages. The player finds it difficult to position the units to enable him or her realistically to simulate the actual actions of the hand or hands and the foot or feet necessary to perform the corresponding actions in the game.

It is difficult to keep the units in position as they tend to move when operated, for example they may slip on the desk or table top and the floor.

The object of the present invention is to overcome these disadvantages

According to the invention there is provided a support means for a controller of the kind specified which comprises a base adapted to be supported on the floor or ground and having mounting means for the hand-operated device of the controller and mounting means for the foot-operated device of the controller.

One or both of the mounting means is preferably provided with means for securing a unit to it.

Preferably the support means is provided with means enabling the position of one or both of the mounting means to be adjusted.

One or both of the mounting means may have means facilitating adjustment of the angular position of the mounting means and/or means facilitating adjustment of the height of the mounting means and/or means facilitating linear adjustment of the mounting means towards and away from the position to be occupied by a player.

Preferably the mounting means for the hand-operated device has provision for angular, height and linear adjustment and the mounting means for the foot-operated device has provision for angular and linear adjustment. Thus, when a controller is fitted to the support means a player can adjust the positions of the hand- and foot-operated devices according to his or her personal requirements (taking into account, in particular, the player's height and the length of his or her arms and legs and the type of seat being used by the player) and to suit the type of activity simulated by the game. This enables the player realistically to perform the hand and foot movements simulated by the game.

In particular, when a driving controller is fitted to the support means, the player can adjust the angle of the wheel and the pedals, the height of the wheel and the distances between the wheel and the pedals and the player's body.

Each mounting means is preferably in the form of a platform.

The invention will now be described, by way of example, with reference to the accompanying drawings, in which:—

Figure 2:
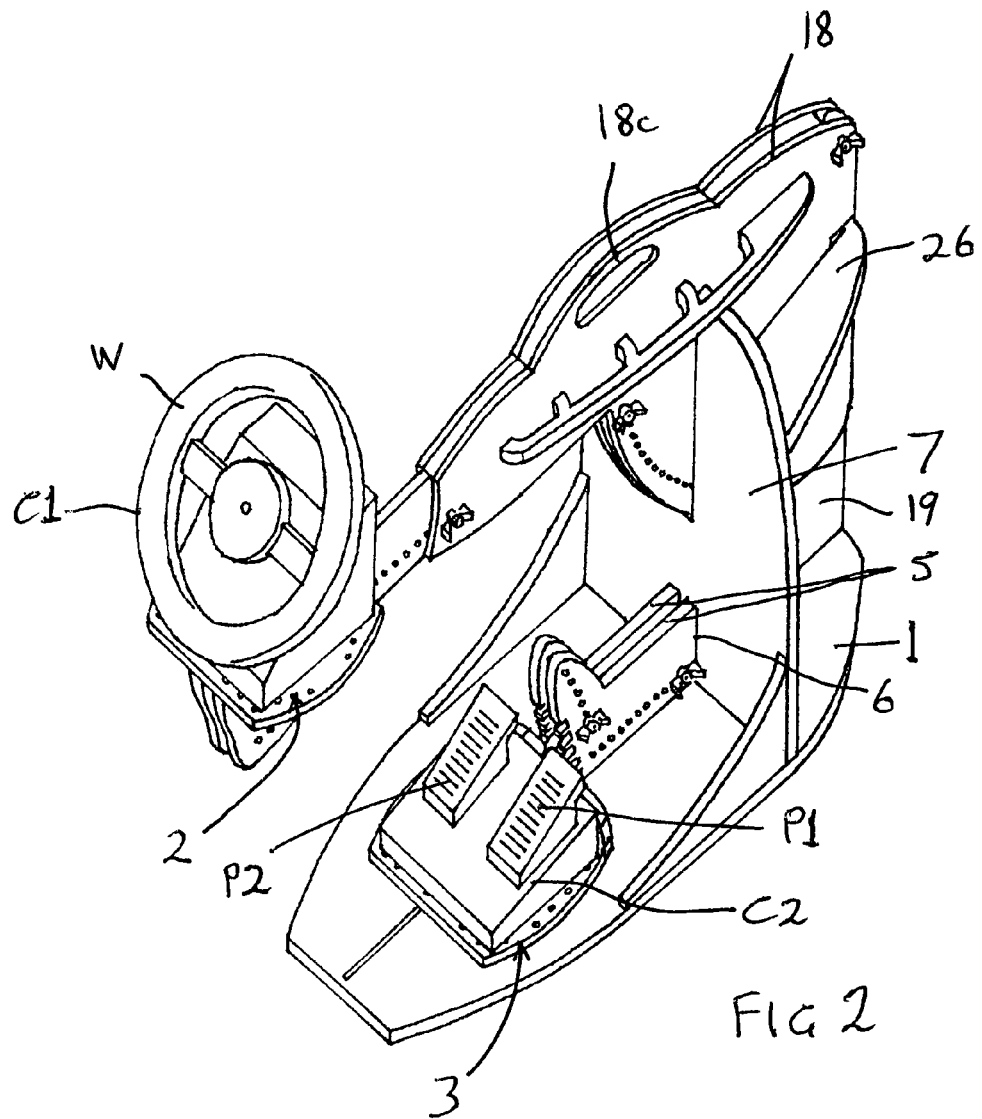
Figure 3:
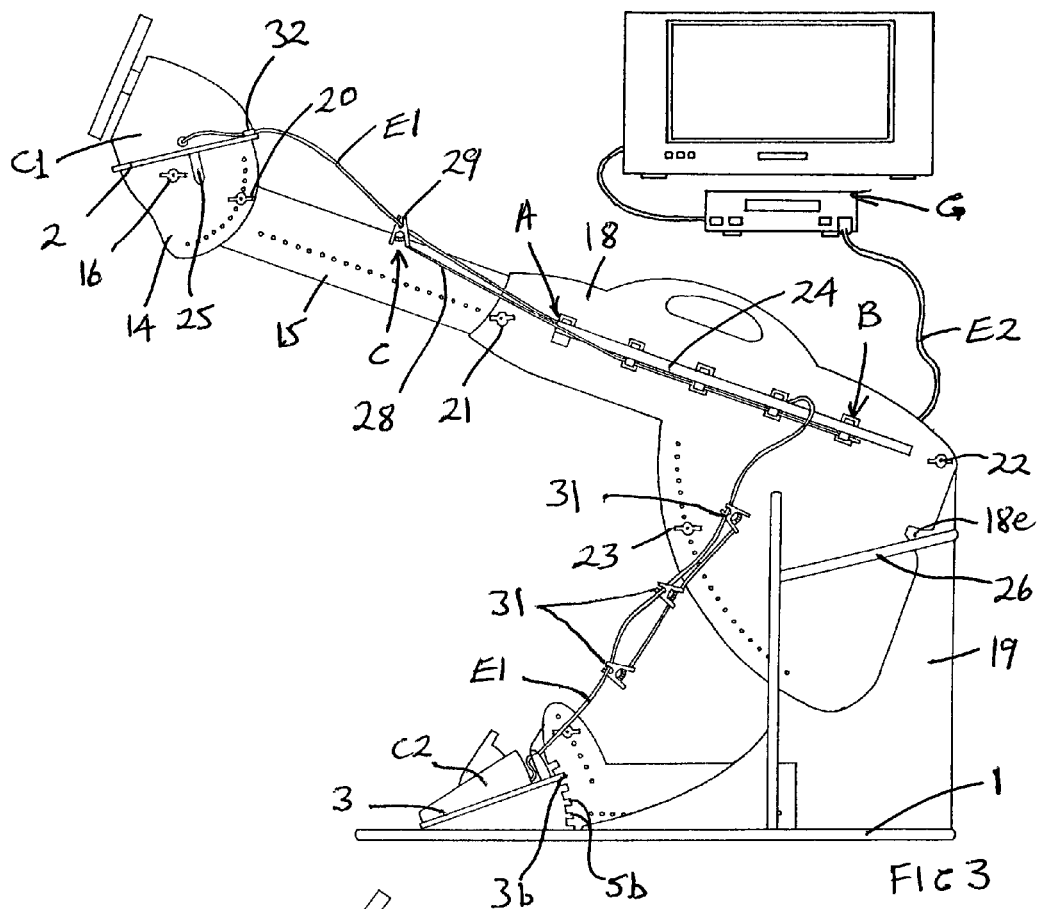
Figure 4:
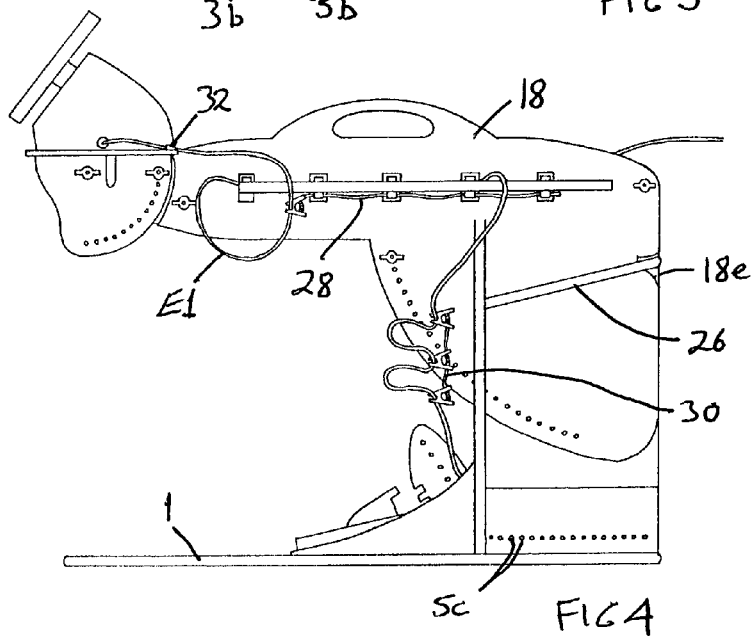
Figure 5:
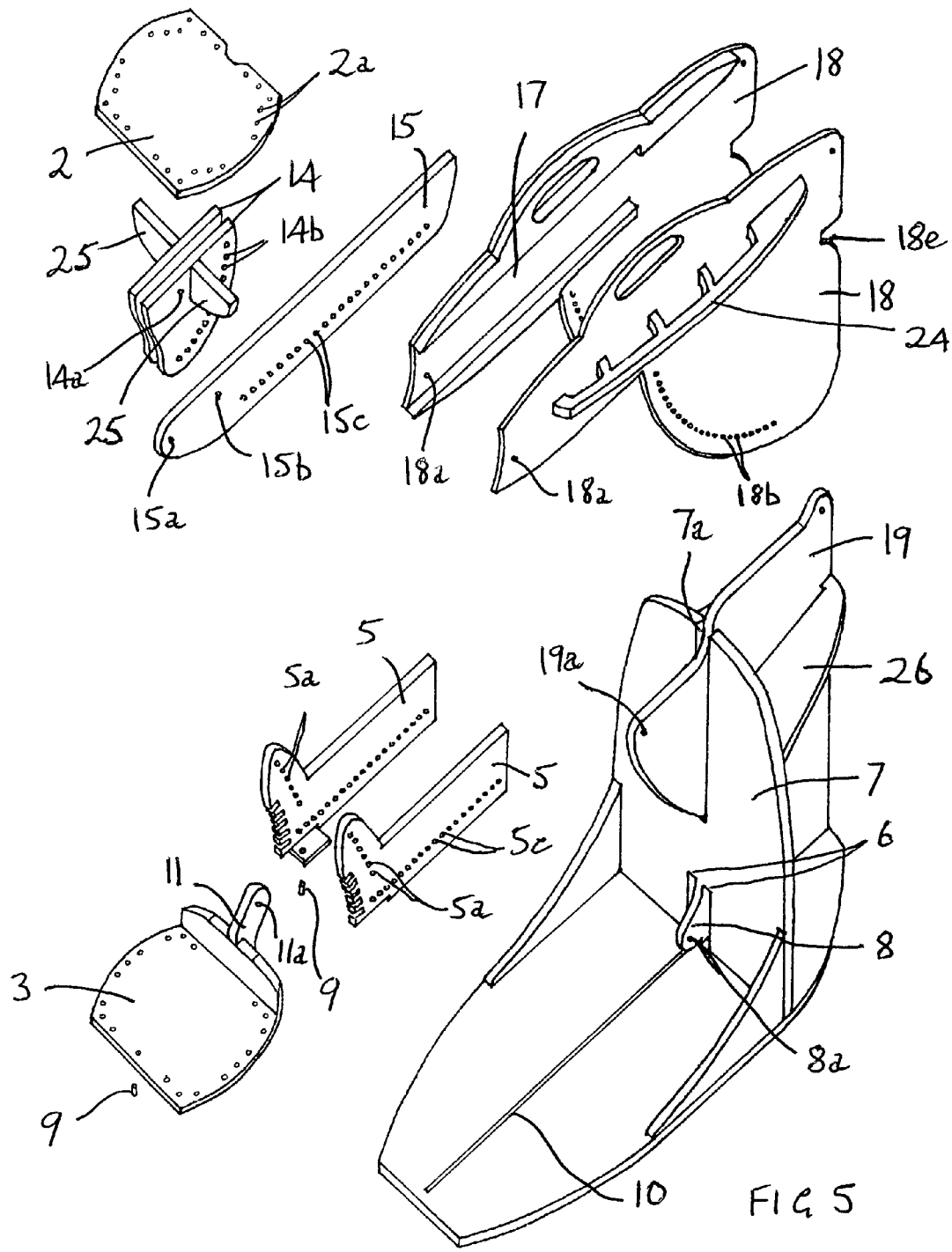

FIG. 1 is a perspective view from above of a preferred form of support means according to the invention, FIG. 2 is a similar view of the support means showing a driving controller fitted to it, FIGS. 3 and 4 are side views showing the support means in two different positions, FIG. 5 is a perspective view from above showing the support means in exploded form, FIG. 6 is a perspective view from above of one of the electrical cable holders of the support means, FIG. 7 is a perspective view from below of the cable holder shown in FIG. 6, FIG. 8 is a detailed sectional view of one of the cable fasteners of the electrical cable holders, and FIG. 9 is a view corresponding to FIG. 8 showing the fastener in an open position.

The support means illustrated in the drawings comprises a base 1 in the form of a flat panel having two mounting means 2 and 3 in the form of platforms for the hand-operated device and the foot-operated device, respectively, of a controller for controlling a game which simulates a human activity involving hand and foot movements, the hand-operated device and a foot-operated device being operable by a player of the game to cause the game to simulate such movements.

By way of example, FIG. 2 shows the support means fitted with a driving controller for controlling a game which simulates the driving of a car, the controller comprising a steering wheel unit C1 mounted on the platform 2 and a pedal unit C2 mounted on the platform 3. The steering wheel unit comprises a base part supporting a steering wheel W which is turnable to steer the car in the game, and the pedal unit comprises a base part carrying two pedals P1 and P2 which a player depresses to accelerate and brake the car respectively.

The controller is connected to a video games console or a personal computer diagrammatically illustrated at G in FIG. 3 which is programmed to play the game. An electrical cable E1 connects the steering wheel unit C1 to the pedal unit C2 and an electrical cable E2 connects the steering wheel unit to the console or computer G.

The platforms 2 and 3 are formed with holes 2a and 3a (FIG. 1) to receive bolts or screws or other means for securing base parts of the units C1 and C2 to them.

In use, the base 1 is placed on the floor in front of the player who normally sits on a seat in the same position as he or she would be in if sitting in a real car (although the controller could be operated from a standing position). The seating position may vary depending, in particular, on whether the car in the game is a road car or a racing car. The platforms are adjustable to enable the player to place the units C1 and C2 in the same positions as the steering wheel and pedals occupy in a real car. The player can therefore operate the steering wheel and the pedals in a realistic manner and the support means ensures that they do not move relative to the player.

The platform 3 is mounted on a support 4 comprising two parallel members 5 which are slidable towards and away from the player along the top of the base 1, being guided by two slots 6 formed in a upright panel 7 attached to the base, a tongue 8 disposed between the slots and two pins 9 which project downwardly from the platform 3 and run in a groove 10 formed in the base (FIG. 5).

The platform 3 has a projecting part 11 formed with a hole 11a (FIG. 5) which can be aligned with any one of a series of holes 5a formed in the members 5 depending on the required angular position of the platform, a bolt then being inserted into the aligned holes and secured by a wing nut 12 (FIG. 1) to secure the platform in position. To provide further support for the platform in its adjusted position it has a lip 3b (FIG. 3) which, prior to insertion of the bolt into the aligned holes, is engaged in one of a series of slots 5b formed in the members 5. The platform 3 can be set at the required distance from the player, taking into account the length of the player's legs, by sliding it along the base 1 until one of a series of holes 5c formed in each member is aligned with a hole 8a formed in the tongue 8 (FIG. 5), a bolt then being inserted into the aligned holes and secured by a wing nut 13 (FIG. 1).

The platform 2 is fixed to two parallel members 14 which straddle a member 15 and are pivotally mounted on it for turning about the axis of a bolt passing through aligned holes 14a and 15a in the respective members 14 and 15, the bolt being secured by a wing nut 16 (FIG. 3). The member 15 is mounted for rectilinear sliding movement towards and away from the player in opposed channels 17 provided on two parallel members 18 (FIG. 5). These two members straddle and are mounted on an upright panel 19 which is attached to the top of the base 1 and the front side of the panel 7, the members being located at opposite sides of the panel 19 in a slot 7a formed in the panel 7.

The members 14 have a series of holes 14b any one of which can be aligned with a hole 15b in the member 15 by pivoting the members 14 to set the required angular position of the platform 2 relative to the member 15, a bolt being inserted into the aligned holes and secured by a wing nut 20 (FIG. 3).

The member 15 can be adjusted linearly relative to the members 18 by sliding it along the channels 17 to set the distance between the platform and the player, whereupon one of a series of holes 15c in the member is brought into alignment with a pair of holes 18a in the members 18 and a bolt is inserted into the aligned holes and secured by a wing nut 21 (FIG. 3) to lock the member 15 in place.

The members 18 are pivotally mounted on the upright panel 19 for turning about an axis formed by a bolt passing through aligned holes in the members and the panel, the bolt being secured by a wing nut 22 (FIG. 3). The angular position of the members 18 can be adjusted by pivoting them about the axis to adjust the height of the platform 2, this bringing one of a series of holes 18b in each member 18 into alignment with a hole 19a in the panel. A bolt is then inserted into the aligned holes and secured by a wing nut 23 (FIG. 3).

The support means therefore has a wide range of possible adjustments for the platforms 2 and 3 to suit the player and the game being played. The support means can be used with any appropriate type of seat or chair and different types of hand- and foot-operated devices. The members 18 are formed with apertures 18c to provide a handle by which the support means can be easily carried and moved from place to place. The support means can be disassembled for transport and storage.

Possible modifications include making parts of the support means, for example the base, collapsible and providing the base with lockable wheels or castors.

The support means may be made of any suitable material, for example plastics. The members 18 have fins 24 attached to their outer sides to give them additional rigidity. In order to give the platform 2 extra rigidity members 25 are attached to the platform and the members 14. Also, a generally U-shaped member 26 straddles the members 18 and 19 to add further rigidity, its central part being attached to the front edge of the member 19 and its rear ends being attached to the member 7. Notches 18e formed in the members 18 (FIGS. 3 and 5) allow these members, and hence the steering wheel unit C1, to be positioned at low angles without the member 26 fouling the members 18.

Instead of bolts with wing nuts other fixing means can be used. Also, the hand- and foot-operated devices could be secured to the platforms by other means.

The holes 5a, 5c in the members 5, the holes 14b in the members 14, the holes 15c in the member 15 and the holes 18b in the members 18 may be provided with markings, for example numbers, so that each player can record for future use the positions in which the parts of the support are set to suit that player.

The support means is provided with a cable management system to hold the electrical cables of the controller and prevent them being yanked, crushed or otherwise damaged or becoming entangled when the support means is being adjusted and the devices C1 and C2 are being used. The two cables E1 and E2 running from the steering wheel unit C1 to the pedal unit C2 and the console or computer G are positioned at the respective outer sides of the members 18 where they are held by cable holders associated with the respective fins 24. The cables lie in upwardly facing channels 24a formed in the fins 24 and are held in position by cable fasteners. Each fin has five such fasteners comprising elastic elements 27 as shown in FIGS. 6 to 9. Each element 27 normally assumes a closed position to hold the relevant cable in the channel of the relevant fin as shown in FIG. 8, and can be pulled upwardly against the effect of its springiness as shown in FIG. 9 to enable the cable to be inserted into and removed from the channel.

Referring to FIGS. 3 and 4, each cable E1, E2 is securely attached to the relevant fin 24 at point A. An elongate elastic element 28 is attached to each fin at point B, passes loosely through holes 24b formed in the underside of the fin and has its other end attached by a spring clip 29 to the relevant cable at point C. An elongate elastic element 30 is also secured by spring clips 31 to the cable E1 at spaced intervals. The two cables are secured to the platform 2 by spring clips 32 and the cable E1 is similarly secured to the platform 3 by a spring clip (not shown).

When setting up the support means for use, with the steering wheel and pedal units mounted on the platforms 2 and 3 and the electrical cables connected to the units, the platforms 2 and 3 are first pulled towards the user to the maximum possible extent as illustrated in FIG. 3. Then the electrical cables E1 and E2 are attached to the platform 2 by the spring clips 32 and to the fins 24 at point A so that they are taut between these clips and point A, the cables also being located in the channels 24a of the fins and secured by the elements 27. The cable E1 is also attached to the platform 3. The elastic elements 28 which are attached to the fins at point B are stretched and attached to the respective cables by the spring clips 29 at point C. The elastic element 30 is attached in a stretched condition to the cable E1 by the spring clips 31 so that the cable is taut. As a result, when the platforms 2 and 3 are moved away from the user to the required positions to suit the user as illustrated in FIG. 4, the elastic elements 28 and 30 contract to hold the cables in neat loops.

Instead of the elastic elements 27, other forms of spring-biased fasteners may be used to hold the cables in the channels 24*a* of the fins 24. Likewise, other forms of releasable spring-operated connectors may be used instead of the spring clips 29, 31 and 32.

If the support means is to be used with a games controller in which there are wireless connections between the steering wheel unit, the pedal unit and the video games console or computer, the cable management system may be omitted.

The invention claimed is:

1. A support device for a controller for controlling a game which simulates a human activity involving hand and foot movements, the controller comprising a hand-operated device and a foot-operated device operable by a player of the game to cause the game to simulate such movements, the support device comprising
   a base which is adapted to be supported on the floor or ground
   an upright support attached to the base and extending upwardly therefrom;
   a mounting for the hand-operated device of such a controller and a mounting for the foot operated device of the controller;
   the mounting for the hand-operated device being provided with a support comprising a member which has an end which carries the mounting and an end part remote from the mounting, said remote end part of the member being pivotally mounted to the upright support so as to permit pivoting about a horizontal axis and the end which carries the mounting being movable up and down by pivoting the member to adjust the height of the mounting.

2. A support according to claim 1 wherein the support member for the mounting for the hand-operated device is slidable relative to the pivotally mounted end part thereof to adjust the distance between the ends of the support member.

3. A support device as claimed in claim 1 wherein the support for the mounting for the hand-operated device is constructed to facilitate angular adjustment of the mounting relative to the said pivotally mounted member.

4. A support device as claimed in claim 1 wherein the mounting for the foot-operated device is provided with a support constructed to facilitate rectilinear adjustment of the said mounting relative to the base towards and away from the position to be occupied by a player.

5. A support device as claimed in claim 1 wherein the mounting for the foot-operated device is constructed to facilitate adjustment of the angular position of the mounting relative to the base.

6. A support device as claimed in claim 1 wherein the upright support comprises an upright panel attached to the base and to one side of a further panel which is also attached to the base.

7. A support device as claimed in claim 1 wherein the mounting for the hand-operated device is in the form of a platform which is mounted on the support member for angular adjustment relative to the support member, and is mounted relative to the said pivotally mounted end part for rectilinear sliding movement relative to the support member, a securing structure being provided for securing the platform, the said further member and the pivotally mounted member in a plurality of different positions.

8. A support device as claimed in claim 1 wherein the mounting for the foot-operated device is in the form of a platform which is mounted on a member for angular adjustment relative to the member, this member being mounted on the base for rectilinear sliding movement relative to the member, a securing structure being provided for securing the platform and the said member in a plurality of different positions.

9. A support device as claimed in claim 6 wherein the mounting for the hand-operated device is in the form of a platform which is mounted on a member for angular adjustment relative to the member, this member being mounted on the said pivotally mounted member for rectilinear sliding movement relative to the member, a securing structure being provided for securing the platform, the said further member and the pivotally mounted member in a plurality of different positions, and wherein the mounting for the foot-operated device is in the form of a platform which is mounted on a member for angular adjustment relative to the member, this member being mounted on the base for rectilinear sliding movement relative to the base, a securing structure being provided for securing the platform and the said member in a plurality of different positions and wherein the pivotally mounted member carrying the mounting for the hand-operated device is located in a slot in the said further panel and the rectilinearly slidable member carrying the mounting means for the foot-operated device is guided by a slot in the said further panel.

10. A support device as claimed in claim 1 which is provided with an electrical cable management system.

11. A support device as claimed in claim 10 wherein the said system comprises cable holders provided on the support and having fasteners for holding cables in the holders.

12. A support device as claimed in claim 10 wherein the said system comprises elongate elastic elements having connectors for attaching them to cables.

13. A driving controller for controlling a game which simulates the driving of a car, the controller comprising a steering wheel and a pedal unit, each of which is supported by a mounting, the steering wheel being mounted on a steering wheel mounting which is provided with a steering wheel support comprising a member, having two ends, one end of which is mounted for pivoting about a horizontal axis on an upright support attached to a base, and the other end of which carries the steering wheel mounting and is free to move up and down by pivoting the member to adjust the height of the said mounting.

14. A driving controller for controlling a game which simulates the driving of a car, as claimed in claim 13, wherein the pedal unit is mounted on a platform which is mounted on a pedal support, which is constructed to facilitate rectilinear adjustment of said pedal mounting relative to the base of the pedal support, towards and away from a position to be occupied by a player of the game.

* * * * *